United States Patent [19]
Lucas

[11] 3,808,816
[45] May 7, 1974

[54] TEMPERATURE RESPONSIVE DEVICE
[75] Inventor: William P. Lucas, Stratford, Conn.
[73] Assignee: Robertshaw Controls Company, Richmond, Va.
[22] Filed: Aug. 15, 1972
[21] Appl. No.: 280,935

[52] U.S. Cl.................. 60/530, 92/47, 138/DIG. 3
[51] Int. Cl. ....................... F28d 15/00, F03g 7/06
[58] Field of Search.......... 60/23; 92/41, 46, 47, 42; 138/DIG. 3

[56] References Cited
UNITED STATES PATENTS

| 1,905,583 | 4/1933 | Giesler | 92/47 |
| 2,073,168 | 3/1937 | Newell | 60/23 |
| 2,730,597 | 1/1956 | Podolsky et al. | 60/23 |
| 3,213,764 | 10/1965 | Nelson et al. | 92/41 |
| 3,324,895 | 6/1967 | Johnson | 92/47 |

*Primary Examiner*—Edgar W. Geoghegan
*Assistant Examiner*—H. Burks, Sr.
*Attorney, Agent, or Firm*—Anthony A. O'Brien

[57] ABSTRACT

A temperature responsive device includes a bellows sealingly mounted in a casing to define a sealed chamber therebetween with a thermally responsive fluid filling the chamber; a plastic coating on the bellows impedes heat transfer thereto and retains the heat in the fluid causing acceleration of its volumetric change.

9 Claims, 2 Drawing Figures

PATENTED MAY 7 1974　　3,808,816

TEMPERATURE RESPONSIVE DEVICE

BACKGROUND OF THE INVENTION

1. Field of the Invention:

This invention relates to a temperature responsive device and more particularly to a temperature responsive device having a bellows operated in accordance with a volume change of a thermal fluid.

2. Description of the Prior Art:

U.S. Pat. No. 3,213,764 is representative of the prior art in illustrating a bellows construction formed by a metal bellows coated with a first layer of rubber to absorb vibration energy and with a second layer of a resin-rubber to protect the first layer from aromatic liquids such as fuel. U.S. Pat. Nos. 2,779,564 and 2,920,656 are examples of the prior art wherein the entire bellows is made of polytetrafluoroethylene. Furthermore, the use of conventional metallic bellows as temperature responsive devices is well known to those persons skilled in the art.

In all of the known prior art devices involving temperature monitoring, a problem exists due to the time lag inherent in temperature responsive devices utilizing bellows to perform an operation as a result of a temperature change. In particular, there is a time interval between the initial exposure of the device to the medium or environment being temperature monitored and the ultimate operation of the bellows. Such time lag results because the temperature responsive device, either in whole or in part, must assume the heat of the medium being monitored before it can complete its transducing function.

SUMMARY OF THE INVENTION

The present invention is summarized in a temperature device including a casing made of heat conductive material, a bellows mounted in the casing to define a sealing chamber therein, a charge of thermally responsive fluid in the sealed chamber undergoing volumetric change in response to heat variations sensed by the casing for causing corresponding expansion and contraction of the bellows, and means on the bellows impeding heat transfer between the charge and the bellows whereby the volumetric change of the charge is accelerated.

An object of the present invention is to reduce the time lag between heat sensing and operation in a temperature responsive device.

The present invention has another object in that the response time of a temperature responsive device is reduced by accelerating the volumetric change of a thermal fluid therein.

It is another object of this invention to coat the bellows of a temperature responsive device with a plastic material which impedes dissipation of heat from a thermal fluid in the device.

A further object of the present invention is that a surface added to a bellows of a temperature responsive device effects a quick response and eliminate chaffing with the casing of such device.

Other objects and advantages of the present invention will become apparent from the following description of a preferred embodiment taken in conjunction with the accompanying drawings.

DESCRIPTION OF THE PREFERRED EMBODIMENT

Figure 1:
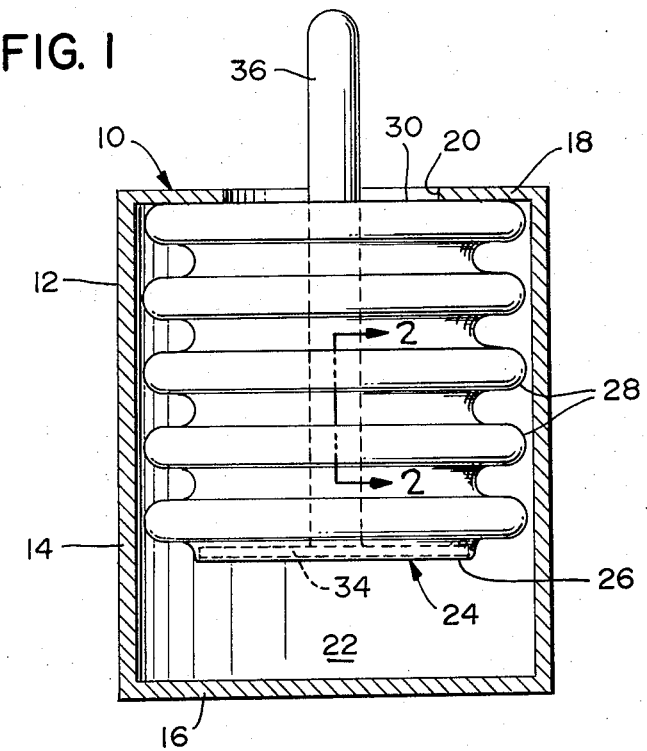
FIG. 1 is an elevation view with parts in section of a temperature responsive device embodying the present invention.

As is illustrated in FIG. 1, the present invention is embodied in a temperature responsive device, indicated generally at 10, including a hollow casing 12 integrally formed by a cylindrical wall 14 and oppositely disposed end walls 16 and 18. The end wall 18 has an opening 20 centrally located along the longitudinal axis defined by the cylindrical wall 14. The walls 14, 16 and 18 define an internal chamber 22 of the casing 12.

Figure 2:
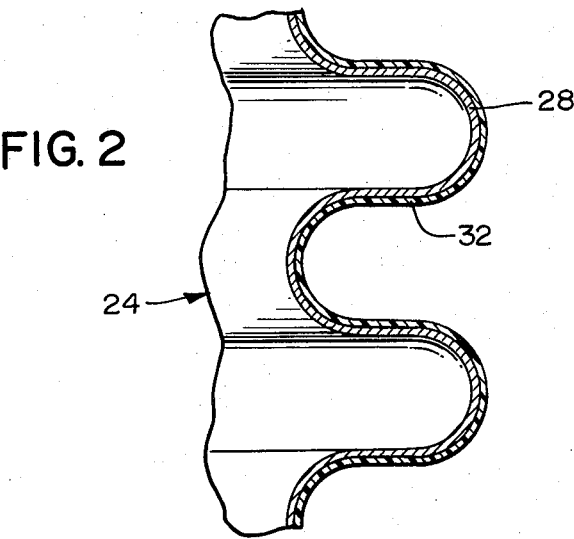
FIG. 2 is a partial cross section taken along line 2—2 of FIG. 1 but shown on an enlarged scale.

A belllows 24 is disposed in the chamber 22 with a closed end 26 extending toward the end wall 16 of the casing 12. As is conventional in the art, the bellows 24 includes a series of corrugated or convoluted elements 28 integrally formed with and extending between its closed end 26 and an opened end 30. The opened end 30 is secured to the interior surface of the casing end wall 18 by any suitable means, such as brazing, welding, etc. so that the chamber 22 is hermetically sealed. The opening in the bellows end 30 generally conforms to the opening 20 in the casing end wall 18, however, any type of opening in the bellows end 30 may be utilized. As is illustrated in FIG. 2, the outer surface of the bellows 24 is coated with a plastic material forming a heat barrier and low friction surface 32 on the bellows 24; in one particular example, polytetrafluoroethylene (marketed under the trade name TEFLON) was utilized for the heat barrier and low friction surface 32.

A flat disc 34 is bonded or otherwise secured to the interior surface of the bellows closed end 26 for unitary movement therewith. An actuator stem or rod 36 having one end inegrally formed with the disc 34 extends along the longitudinal axis of the bellows 24 and the casing 10; the free end of the stem 36 protrudes through the end wall opening 20 and is adapted to actuate various devices such as, valves, switches, levers, control arms, indicators, etc.

The casing 12 is made of a material having good heat conductive characteristics, such as a plated or alloy steel, copper or the like. The bellows 24 is made of a thin-walled material having good characteristics of flexibility and heat conduction, such as copper to the like. The plastic coating 32 on the bellows 24 is selected from plastic materials having a low friction characteristic as well as a coefficient of thermal conductivity which is substantially less than that of the material used in the bellows 24. The chamber 22 defines a sealed chamber which is charged or filled with a thermally responsive fluid, such as a vapor or volatile liquid, as is well known in the art. Thus, the casing 12, the bellows 24 and the thermally responsive charge in the chamber 22 constitute a closed system wherein the actuator stem 36 is reciprocated by expansion and contraction of the bellows 24 in accordance with temperature variations. In practice, the temperature responsive device 10 is designed with a predetermined set temperature that is usually fixed by factory calibration methods.

The outer surfaces of the bellows convolutions are slightly spaced from the interior surface of the cylindrical wall 14; this spacing or clearance in FIG. 1 is merely intended to illustrate such a clearance and not the actual dimension thereof. In accordance with the present invention, this annular clearance has a smaller dimension than heretofore possible resulting in a more compact unit for a given bellows size. During movement of the bellows 24 in response to temperature variations, the plastic surface 32 presents a low friction surface which substantially eliminate adverse effects of rubbing or chaffing between the bellows convolutions and the interior surface of the cylindrical wall 14.

In operation of the temperature responsive device 10, the metallic casing 12 permits heat transfer by conduction from the environment being sensed to the thermal charge in the casing chamber 22. The plastic surface 32 acts as a heat barrier and thus impedes the transfer of heat from the charge to the bellows 24. Consequently, the charge is caused to heat up faster than normal whereby the volume change of the thermal charge is accelerated. With such an arrangement, the heat transferred to the thermal charge is not dissipated or transferred to the bellows 24 but is retained by the charge and thus reduces the time for the charge to heat up. By retaining the heat in the thermal fluid charge, it will heat up faster and quickly increase in volume which results in contraction of the bellows 24; the actuator stem 36 is then moved upwardly as viewed in FIG. 1. Accordingly, the temperature responsive device 10 operates with a quick response by reducing the time lag as measured between the point when the casing 12 is subjected to the heat and the point when the actuator 36 is operated.

In one particular test, the same heat medium was simultaneously applied to two bellows which were identical in all respects except that one was uncoated and the other was coated with TEFLON. The percentage stroke or movement of each bellows was plotted as the ordinate on a graph with time in seconds plotted as the abscissa. The non-coated bellows reached 63 percent of its stroke in 22.5 seconds while the TEFLON coated bellows reached the same stroke percentage in 17.5 seconds. The 5 second difference represents a reduction of approximately 25 percent in response time. Thus, test results show a significant reduction in response time of the bellows 24 and further reductions in time are also possible because the plastic coating 32 permits the use of closer clearances between the bellows 24 and the casing 12. The above arrangement results in a quick response temperature sensing device wherein the volume change of the temperature responsive charge, vapor or liquid, is accelerated during the major portion of its bellows movement.

Inasmuch as the present invention is subject to many variations, modifications and changes in detail, it is intended that all matter contained in the foregoing description or shown on the accompanying drawings shall be interpreted as illustrative and not in a limiting sense.

What is claimed is:

1. A temperature responsive device comprising
   a casing made of heat conductive material,
   a bellows mounted in said casing to define a sealed chamber therein:
   a charge of thermally responsive fluid in said sealed chamber,
   said charge undergoing volumetric change in response to heat variations sensed by said casing and causing corresponding expansion and contraction of said bellows, and
   means on said bellows impeding heat transfer between said charge and said bellows whereby the volumetric change of said charge is accelerated.

2. A temperature responsive device as claimed in claim 1 wherein the means on said bellows has a lower coefficient of thermal conductivity than that of said bellows.

3. A temperature responsive device as claimed in claim 2 wherein the means of said bellows comprises a plastic coating applied to said bellows so as to be disposed in said sealed chamber.

4. A temperature responsive device as claimed in claim 3 wherein said plastic coating defines a heat barrier surface between said bellows and said charge.

5. A temperature responsive device as claimed in claim 4 wherein the plastic coating also defines a low friction surface to eliminate chaffing of said bellows on said casing.

6. A temperature responsive device as claimed in claim 5 wherein said plastic coating is made from polytetraflouroethylene.

7. A temperature responsive device as claimed in claim 6 wherein said casing and said bellows have coincident openings and are sealingly secured to each other adjacent said openings.

8. A temperature responsive device as claimed in claim 7 wherein said bellows includes an actuator protruding through said openings and being reciprocated relative to said casing in accordance with expansion and contraction of said bellows.

9. A temperature responsive device as claimed in claim 1 wherein said casing includes a hollow cylindrical element having a closed end wall and an opposite end wall with an opening therethrough; wherein said bellows includes a plurality of peripheral convolutions, a closed end and an opposite end with an opening therethrough, the opposite end of said bellows being sealed and fastened to the opposite end wall of said casing whereby the casing opening and the bellows opening are in alignment, said convolutions being slightly spaced by said cylindrical element; wherein said means on said bellows includes a plastic coating defining a low friction and heat barrier surface which precludes chaffing between said convolutions and said cylindrical element during movement of said bellows and which reduces heat dissipation from said charge to said bellows whereby the temperature responsive device is operated with a quick response.

* * * * *